United States Patent [19]
Ueda et al.

[11] Patent Number: 5,288,194
[45] Date of Patent: Feb. 22, 1994

[54] DEVICE FOR UNLOADING ARTICLE FROM CIRCULATIVE LOADING BASE

[75] Inventors: Satoshi Ueda, Itami; Kiyoshi Fukuyama, Moriyama, both of Japan

[73] Assignee: Tsubakimoto Chain Co., Osaka, Japan

[21] Appl. No.: 943,876

[22] Filed: Sep. 11, 1992

[30] Foreign Application Priority Data

Oct. 18, 1991 [JP] Japan .................. 3-092955

[51] Int. Cl.⁵ .............................. B65G 1/133
[52] U.S. Cl. ................. 414/331; 414/278; 414/285
[58] Field of Search ............ 414/266, 267, 268, 271, 414/272, 276, 277, 278, 264, 285, 659, 331, 222, 257; 198/570, 574, 678.1, 680, 685; 211/1.51, 1.52, 1.56

[56] References Cited

U.S. PATENT DOCUMENTS

| | | | |
|---|---|---|---|
| 2,718,972 | 9/1955 | Temple | 414/331 X |
| 3,695,462 | 10/1972 | Sullivan | 414/285 X |
| 5,161,930 | 11/1992 | Canziani | 414/331 |
| 5,228,820 | 7/1993 | Stansfield et al. | 414/278 |

FOREIGN PATENT DOCUMENTS

| | | | |
|---|---|---|---|
| 188208 | 11/1983 | Japan | 414/331 |
| 36001 | 2/1984 | Japan | 414/331 |

*Primary Examiner*—Frank E. Werner
*Assistant Examiner*—James T. Eller, Jr.
*Attorney, Agent, or Firm*—John Lezdey

[57] ABSTRACT

The invention relates to a device for unloading an article from a circulative loading base. There is provided an endless belt which forms a loading surface that is mounted rotatably in a backward inclined position to a conveyor chain. The belt comes into pressure contact with a friction roller so as to allow the belt to rotate in the unloading direction by frictional conduction to deliver articles on the belt to be delivered in a horizontal direction.

1 Claim, 3 Drawing Sheets

DEVICE FOR UNLOADING ARTICLE FROM CIRCULATIVE LOADING BASE

FIELD OF THE INVENTION

The present invention relates to a device for unloading articles from a circulative loading base.

BACKGROUND OF THE INVENTION

Japanese Laid-Open Patent Application No. 32415/1992 discloses a loading base in a circulative conveyance which is tilted forward for unloading an article placed on the loading base in an unloading position. As disclosed therein, no matter whether a circulative conveyance path of the loading base is in a horizontal plane or in a vertical plane, the loading base is tilted forward in the unloading position, thereby allowing the article thereon to slide along the upper surface of the loading base for the discharge thereof. Alternatively, instead of tilting the loading base, an endless belt which forms a loading surface is entrained about the loading base and the article thereon is delivered and discharged in the horizontal direction by the rotation of the endless belt.

In the above prior art, when the loading base is tilted, the article thereon is allowed to slide for discharge. The article may be damaged due to a drop impact, and the working atmosphere is deteriorated by the generation of noise due to a drop impact sound. On the other hand, in the case of horizontal delivery and unloading using an endless belt, there is no fear of damage to articles because there is neither sliding nor dropping of the articles, and the generation of noise can be prevented. However, each loading base must be provided with an endless belt driving means to drive the endless belt for the delivery of the article thereon. The mounting of means for supplying power to the belt driving means of the loading base under movement results only a complicated structure of the power supply means and an increase in the size and weight with each loading base. Further, the mounting spacing between adjacent loading bases becomes longer, so the conveyance efficiency is deteriorated. It is necessary to use a conveyor chain to which loading bases are mounted which is large enough to fully bear the weight of the loading bases.

SUMMARY OF THE INVENTION

According to the present invention, in order to eliminate the above-mentioned drawbacks of the prior art, an endless belt which forms a loading surface is mounted rotatably in a backward position to a conveyor chain. A rotatable drive shaft is disposed side by side and in parallel with the conveyor chain. Friction rollers are fixed onto the rotatable drive shaft in positions corresponding to unloading positions, and there is provided means which pushes up a rear end position of the endless belt which is kept tilted backward, against the friction roller so as to allow the rotation of the friction roller to be transmitted directly to the endless belt surface to rotate the endless belt in the unloading direction until an article put thereon is delivered and discharge horizontally.

In operation, the conveyor chain is operated intermittently. A loading base frame is stopped temporarily in an unloading position, and the endless belt on the loading base frame is brought into pressure contact with an associated friction roller on a rotatable drive shaft which is under rotation so as to allow the belt to rotate in the unloading direction by virtue of a frictional conduction. Consequently, the article on the belt is delivered and discharged in the horizontal direction.

DESCRIPTION OF THE PREFERRED EMBODIMENTS

Figure 1:
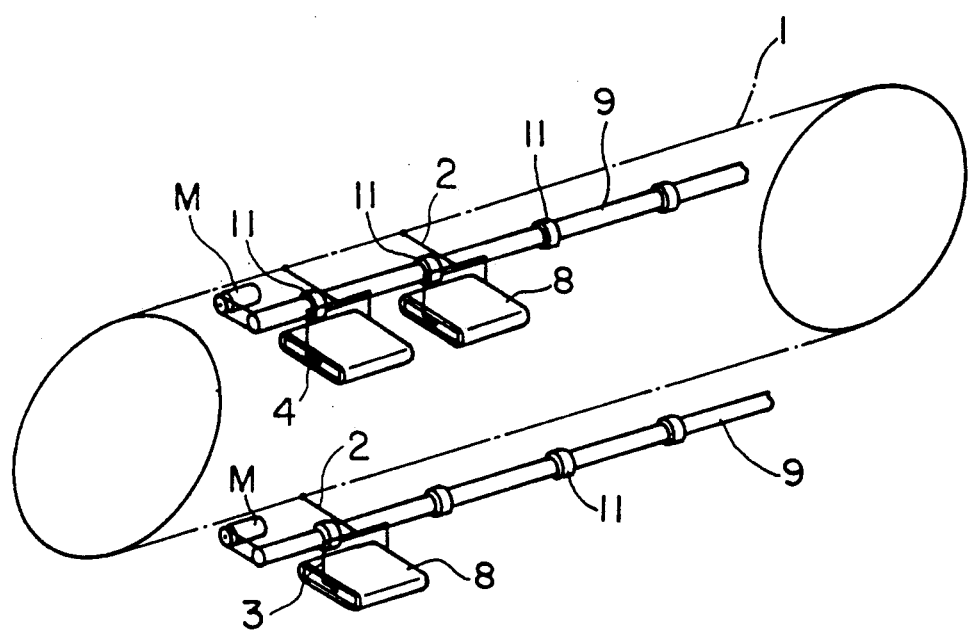
FIG. 1 is an perspective view showing an embodiment of the present invention.
Figure 2:
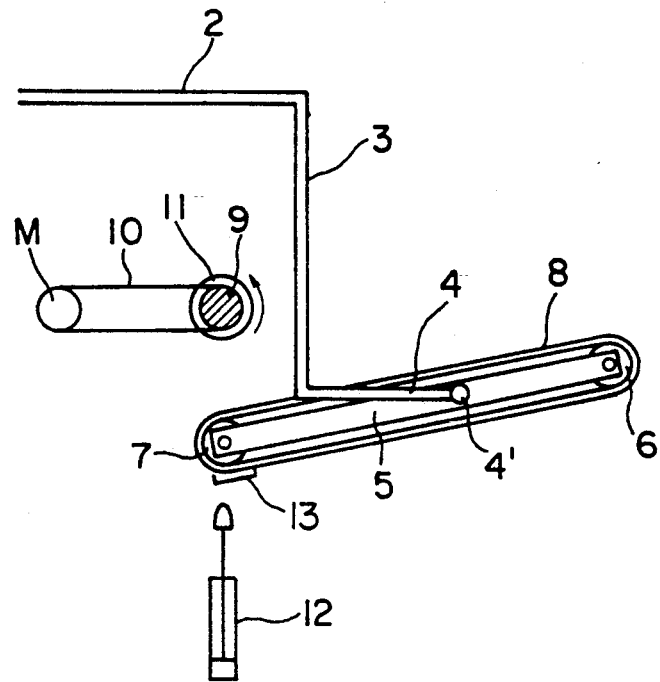
FIG. 2 is a sectional side view of a principal portion illustrating a loading base position during conveyance.

FIGS. 1 to 4 illustrate an embodiment of the present invention, in which a plurality of guide rods 2 are mounted at suitable intervals to a conveyor chain 1 which circulates in an endless manner in a vertical plane. A pair of support rods 4, 4 are provided which project from one end of each guide rod 2 through a support plate 3. A loading base frame 5 is supported by said support rods 4, 4 pivotably while being urged in a backward inclined position. In the embodiment illustrated in FIG. 4, support points 4', 4' of the support frames 4, 4 are positioned near an unloading end, or a front end, of the loading base frame 5. The support rods 4, 4 and the loading base frame 5 have stoppers (not shown) which restrict the backward inclination angle of the loading base frame and which are retained with each other.

To the front and rear ends of the loading base frame 5 there are rotatably mounted pulleys 6 and 7, respectively, of a small diameter. An endless belt 8 which forms a loading surface is stretched between both pulleys 6 and 7.

As shown in FIG. 1, rotatable drive shafts 9 are fixedly provided side by side and in parallel with straight portions of the endless chain 1. The shafts 9 are each driven rotatably by motor M through a transmission chain 10. Friction rollers 11, 11 are fixed onto the rotatable drive shafts 9 in positions corresponding to article unloading positions.

Just beneath each friction roller 11 is disposed a push-up means 12, whose operation is controlled by an assortment signal. The push-up means 12 pushes up the rear end portion of the loading base frame 5 through a metallic pushing piece 13 to change the position of the loading base frame 5 from the backward inclined position to a forward inclined position and at the same time brings the endless belt 8 into pressure contact with the friction roller 11.

Figure 3:
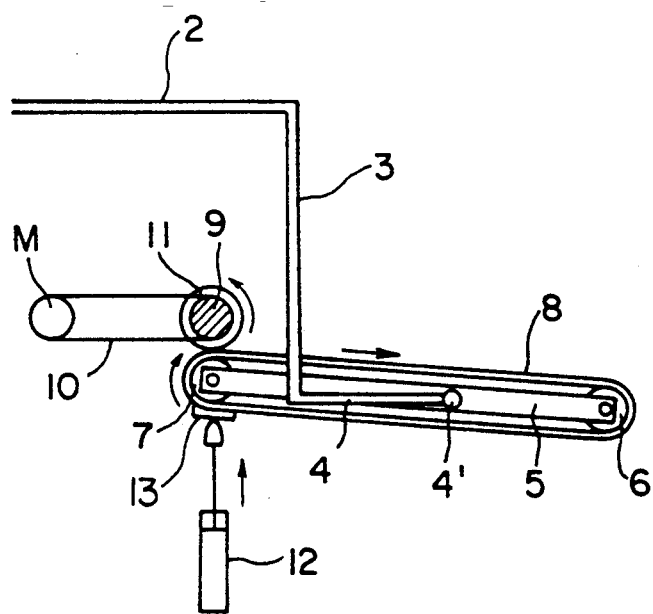
FIG. 3 is a sectional side view of the principal portion, illustrating a loading base position during unloading.
Figure 4:
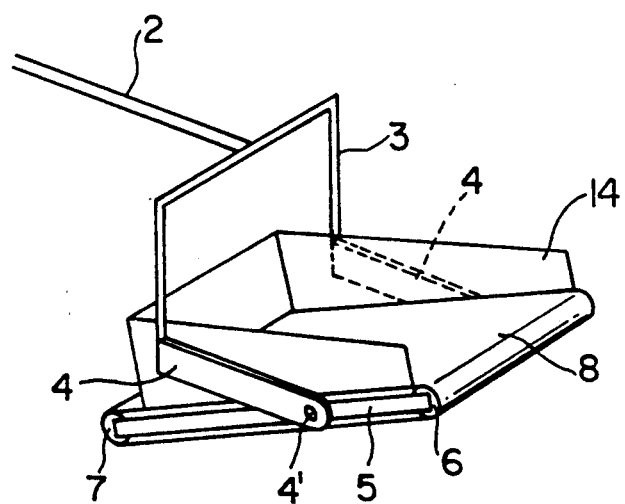
FIG. 4 is an perspective view of a loading base.

As a result, the rotation of the friction roller is transmitted to the endless belt 8, which in turn rotates in the direction as indicted by the arrows in FIG. 3 to deliver the article on the belt to the unloading position.

A shrouding plate 14 may be erected on the loading base frame 5 to prevent the article on the loading base from falling backward or sideways during conveyance or during horizontal delivery.

According to the present invention, since the loading base is urged in a backward inclined state, there is no fear of an article falling from the delivery end on the loading base during conveyance. Besides, during delivery, the loading base is made approximately horizontal and the endless belt which forms a loading surface is rotated, whereby the article thereon can surely be delivered up to the unloading position. Consequently, even an article having a bottom with a large frictional coefficient, which is difficult to be delivered by a mere forward tilting of the loading base, can be delivered easily. Moreover, even a rollable article and an article which easily slides can be delivered quietly without rolling and dropping and without sliding and dropping, respectively, so there is no fear of damage caused by the throwing of an article or impact noise caused by the dropping of an article. Furthermore, since the driving force for the delivery of an article on each loading base can be obtained automatically by merely pushing up a rear end portion of the loading base even without mounting a special power source on the loading base, the structure of the loading base becomes smaller in both size and weight. Consequently, there can be attained many practical advantage, for example, the efficiency of the conveyance and assortment can be enhanced by increasing the number of loading bases mounted to the conveyor chain.

What is claimed is:

1. In a device for unloading an article from a circulative loading base, wherein a loading base frame is supported pivotally while being urged in a backwardly inclined state by each of a plurality of support frames mounted at suitable intervals to a circulative conveyor chain having drive means therefore, the improvement comprising:

an endless belt forming a loading surface being entrained about said loading base frame;

a rotatable drive shaft disposed side-by-side and in parallel with said conveyor chain;

means for rotating said drive shaft;

friction rollers fixed to a plurality of positions on said drive shaft corresponding to unloading positions; and push-up means mounted beneath said friction rollers for upwardly pivoting a rear end portion of said loading base frame and urging said endless belt into contact with one of said friction rollers to thereby drive said endless belt for discharging an article contained thereon to one of said unloading positions.

* * * * *